Patented July 28, 1942

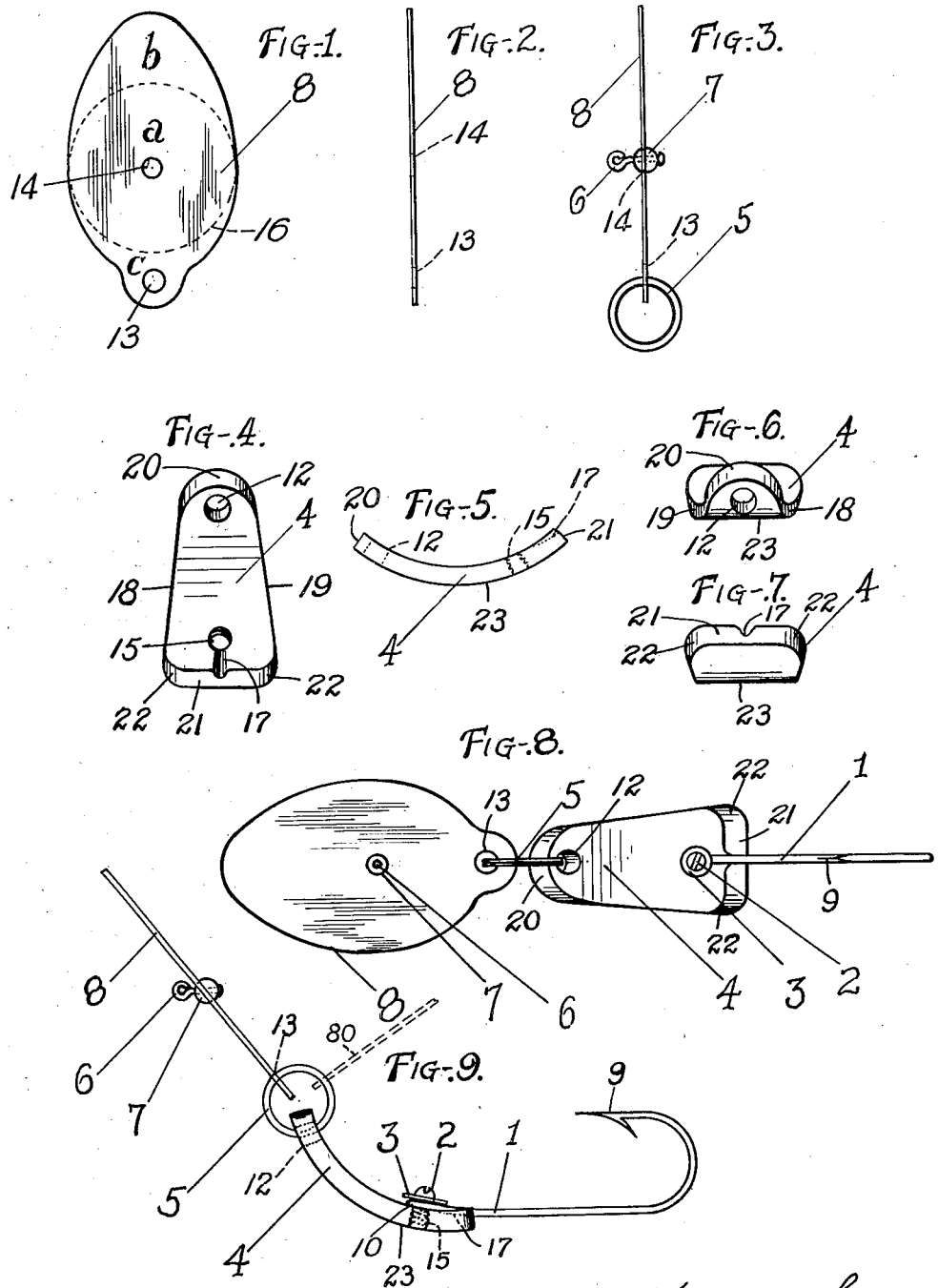

2,291,422

UNITED STATES PATENT OFFICE 2,291,422

FISH LURE

Kendall J. Thomas, Cincinnati, Ohio

Application August 4, 1940, Serial No. 351,329

11 Claims. (Cl. 43—42)

This invention relates to a fish lure of improved design, which possesses a number of important advantages over known devices presently used in the sport or art of fishing.

One object of the invention is to provide a fish lure embodying a minimum number of simple parts so arranged as to enhance the effectiveness of the lure, while at the same time substantially reducing its cost of manufacturing.

Another object of the invention is to provide a fish lure which is so constructed as to go into action promptly upon being retrieved from a cast.

Another object is to provide a lure the action of which takes place very close to the hook point so as to attract the fish to the critical portion of the lure where the hook point is located.

Another object of the invention is to provide a lure that will hook deeply and ride with its hook level at all times, and to render the lure snag-proof and capable of being retrieved over obstructions in the water, without the need for providing a special hook guard.

Another object of the invention is to provide a lure of the character stated, wherein an oscillator blade for attracting the fish operates close to the hook point and performs the incidental function of a hook guard while in motion, while at the same time leaving the hook fully exposed for a "strike."

Among other objects of the invention, are those of providing a lure of simplified construction including a plate and a body so assembled as to permit the lure to be cast into the water and allowed to settle to the bottom, if desired, with the hook disposed horizontally in a vertical plane; to provide a lure that will cast properly on windy days, by reason of a novel assembly of parts offering a minimum of resistance to the air upon being cast, although when in the water the resistance is set up for functionalizing the oscillator; to provide a practical lure that may be converted quickly from a "bright day" lure to a "dull day" lure, by simply substituting bright or dull oscillators as may be required, the substitution being performed quickly and without the aid of tools; to provide a lure that may be fished deep, midway or on the surface of the water without making any mechanical changes, the fishing depth being controlled by the speed of oscillation, and the angularity, of the oscillator plate as will be more fully explained hereinafter.

The foregoing and other objects, are attained by the means described herein and disclosed in the accompanying drawing, in which:

Fig. 1 is a plan view of an oscillator plate, which for convenience of description herein is marked with a broken-line-circle.

Fig. 2 is an edge view of the oscillator plate.

Fig. 3 is an edge view of an oscillator plate assembly, including a line anchor and a split ring.

Fig. 4 is a plan view of the lure body, which forms part of the device.

Fig. 5 is a side view of the lure body.

Fig. 6 is an end view of the body as viewed from the front.

Fig. 7 is an end view of the body as viewed from the rear.

Fig. 8 is a plan view of the assembled lure.

Fig. 9 is a side view of the assembled lure illustrated in Fig. 8.

In the accompanying drawing, the reference character 1 indicates the shank of a fish hook which includes a barbed point 9 and an eye 10. The eye of the hook is adapted for attachment to the body 4 of the lure, by means of a screw 2 or other suitable fastener which preferably has a washer 3 disposed beneath its head. By preference, the washer is made sufficiently large to furnish a head or button upon which suitable bait may be fastened whenever baiting of the lure may be considered necessary or desirable. The term "bait" is used in its broadest meaning, "an enticement," which may include feathers, hairs, streamers of one kind or another, pork rind strips, etc. The shank of the screw is adapted for threaded engagement with a threaded aperture 15 formed in the lure body 4 near its rear end.

The character 5 indicates a split ring of known construction, which is usually formed of a coiled wire having its convolutions resting in close proximity, this split ring being adapted to enter a perforation 12 in the forward end of the body portion 4, and also a perforation 13 in the trailing end of an oscillator plate indicated at 8. Both perforations are made oversize so that the oscillator plate may have a pronounced freedom of movement relative to the lure body. The character 6 indicates a line anchor which may be in the form of a pin having an eye to which the fishing line may be tied. The opposite end of the pin carries a bead 7 which may be of metal, glass or any other hard material, said bead being adapted to seat against the edges of an aperture 14 formed in the oscillator plate 8. The aperture 14 is slightly smaller than the bead, so that the bead will be disposed principally to one face of the oscillator plate and will furnish a swivel or universal joint connection between the line anchor and the plate.

The structure of the oscillator plate 8 is a matter of importance to the present invention. As shown in Fig. 1, the oscillator plate is constructed of very thin and rigid material and is made substantially ovoid of shape. The plate should be perfectly flat and at least as thin as a business card. Stainless steel or sheet material, whether of metal or not, may be employed in making the oscillator plate, it being preferable, however, that the material used have a bright or reflective surface. If fishing in muddy or dark water, it would be good practice to use a highly reflective oscillator plate, for example, one of polished steel or other bright material, whereas for fishing in clear water the practice would be to employ an oscillator plate having a less brilliant surface, for example, one of brass, copper or the like. By means of the split ring connecter 5, which simulates the well known split key ring, the matter of substituting bright and dull oscillator plates becomes a simple operation to be performed quickly and without the aid of tools.

Referring now to Fig. 1, it will be seen that the ovoid plate has been marked, merely for purposes of explanation, with a broken-line-circle 16, the center of which is located below the center of gravity of the oscillator plate, so that an area $a$ of large proportions is circumscribed by the broken line. At the top of the circle there remains an area $b$ which is considerably smaller than the area $a$, whereas below the circle, there is presented a still smaller area $c$. The center of circle 16 is also the center of perforation 14, and these are below the center of gravity of the oscillator plate, so that if the plate were supported upon a transverse shaft, its normal tendency would be to turn and dispose the area $c$ where the area $b$ is located on Fig. 1 of the drawing. The area above a horizontal line drawn through the center of aperture 14 of Fig. 1, is greater than the area beneath such line, and since the oscillator plate is of uniform thickness the portion above such horizontal line will be heavier than the portion below it. In effect, the blade is suspended at the aperture 14 by the bead connecter 7, and were it not for the weight of the body portion 4, there would always be a tendency for the oscillator plate to turn about the point of suspension, to an inverted position, however, the body portion 4 of the lure when submerged, weighs just enough to counteract the tendency of the oscillator blade to rotate to the inverted position. The effect of these proportions and considerations, is to cause a fluttering action of the oscillator plate when the lure is reeled in, assuming the line to be attached to the eye 6. When so reeled in, the planing action and lateral resistance of water upon the oscillator plate 8 causes the blade to lift at various angles, and the larger area above the point of suspension 7 is so acted upon by the water as to cause the blade to oscillate right and left about the aperture 12 as a pivot. The oscillator plate may be said to transcribe an arc conforming to the plane of a cone as it is drawn in by the reel. Moreover, since in the operative or action relationship of the parts indicated in Fig. 9, the aperture 12 of the body is disposed in substantial parallelism with the aperture 13 of the oscillator plate, both the oscillator plate and the ring are permitted a rocking motion relative to the mean axis of the body portion. It has been determined that considerable importance is attached to the fact that the oscillator plate, in the operative or working relationship to the lure body 4, shall have its major axis substantially at right angles to the axis of the body perforation 12. This allows for a freedom of movement of the oscillator plate toward and from its limits of sidewise rocking movement.

As indicated by Figs. 4 and 9, it is considered to form the longitudinal short groove 17 in the upper arched face of the lure body in which groove the shank of the hook may seat when fastened in place by the screw 2. With particular reference to the lure body, it will be observed that the opposite sides 18 and 19 thereof converge toward the semi-circular front end 20 of the body, whereas at the rear end of the body, the sides 18 and 19 intersect the straight rear end 21 at the rounded corners 22. It is important that the lure body be arched as illustrated by Fig. 5, so that the opposite ends thereof project upwardly and outwardly at an obtuse angle which may approximate something greater than 90°. The hook 9 is directed substantially toward the rounded end 20 of the lure body, so that when the body is drawn along or near the bottom of a stream, the hook will be disposed above the body and within a vertical plane that bisects the length of the lure body. The underface 23 of the lure body is substantially flat throughout its length, in the transverse direction, but is curved in the longitudinal direction.

The various structural features of the device above specified, are responsible for the attainment of the objectives enumerated in the introduction to the specifications. Unlike many known types of fish lures, the lure of this invention contemplates a stable condition of the weighted body 4 which carries the hook 1, while a violent oscillating action takes places just ahead of the hook. In operation, the oscillator plate will ordinarily assume positions intermediate those indicated at 8 and 80 of Fig. 9, as the oscillator plate vibrates to one side and the other of an imaginary plane passing vertically along the major axis of the lure body. This disposes the oscillator plate in close proximity to the hook point, where the "strike" will occur, and it will be seen that the force of the "strike" may readily displace the oscillator plate in practically any direction, out of the way of the catch, so as to expose the fish-hook to the greatest possible advantage. The lure body preferably is of metal, such as copper, or an alloy like brass, pot metal, or any other non-ferrous or non-corrosive metal which is relatively much thicker than the oscillator plate, and of considerably greater weight. The action of the lure depends upon several factors, i. e., the lateral resistance of the water against the oscillator plate when reeled in, the displacements of the areas $a$, $b$ and $c$, relative to the suspension points and centers of gravity, along with the form of loose and free joints or connections at 7, 13 and 12; and it is of primary importance that the weight of the body 4, when submerged, be gauged to barely overcome the tendency of the oscillator plate to invert itself by reason of its off-center connection with the line.

It should be understood that when in use, the lure body assumes the position illustrated by Fig. 9, that is, with the hook shank substantially horizontal. The oscillator plate 8 may assume either the full line position, the broken line position, or any intermediate position, reference being had to Fig. 9. When the lure is reeled in slowly, the oscillator plate may be disposed substantially at the full line position of Fig. 9, and it will oscillate as previously explained while the lure is being drawn through the water. Under these circumstances, the oscillator plate will perform a planing function. The planing function will decrease as the lure is reeled in at a greater speed, due to the fact that the oscillator plate will then approach, or may even pass, a vertical position due to the unequal surfaces above and below the swivel connection 7 being subjected to water resistance resulting in tipping the oscillator plate rearwardly toward the broken line position indicated at 80. It will be understood accordingly, that by the time the oscillator plate moves to the inclination indicated at 80, the planing function has been virtually eliminated, and the tendency of the lure will be to seek lower levels in the water. At substantially the position of the oscillator plate which results in the elimination of a planing action, the lure loses its directional qualities more or less, and will dart through the water in various directions laterally of the normal reeling-in direction, to afford a measure of activity which is attractive to certain types of fish. Thus, the angularity of the oscillator to the body of the lure, the speed of the oscillator, and the speed of reeling-in, may determine the fishing depth. From what has been stated above, it should be evident that fast reeling will not cause the lure to rise toward the surface. In determining what action will take place, it must be remembered that the pressure of water against the leading face of the oscillator plate, with the pressure being greater upon the area above or forwardly of the swivel connector 7, determines the angle of the oscillator plate and consequently the effectiveness or lack of effectiveness of its planing function. The more pressure or lateral resistance of water that is encountered by the oscillator plate, the more diminished the planing action becomes. When the water resistance increases to the extent of decreasing the planing action to a substantial nullity, the lure darts out and around in many directions as above explained. In these respects, the lure of the present invention differs from known types of lures which require extremely fast reeling to effect either an elevating or a lowering of the lure. Fast reeling is an unnecessary factor in the controlling of the lure herein disclosed.

One feature of the present lure that is worthy of special note, is the fact that the body of the lure, by reason of its weight and curvature, assumes a suspended relationship to the oscillator plate, such that the shank of the hook rides substantially horizontal or level, and the split ring connection at 5 ensures this attribute of the body and hook regardless of the various inclinations that may be assumed by the oscillator plate between the full line position and the broken line position indicated by Fig. 9. Since the oscillator plate has a lifting function while at certain angles, and since the body at all times is suspended as above explained, through the split ring connection, it is essential that the body be curved in order that the hook shank may advance in the substantially horizontal or level condition. This assists in rendering the hook snag-proof, and also in maintaining the desired activity of the oscillator plate as near as possible to the barbed end of the hook. These various considerations obviously enhance the usefulness and effectiveness of the lure.

What is claimed is:

1. A fish lure comprising in combination an arcuate weighted body having an upturned leading end, and a fish-hook fixedly mounted on the body with its pointed end permanently so disposed that an imaginary line representing an axial extension of the hook point will substantially intersect the upturned leading end of the weighted body, an oscillator plate, and means associating said plate with a fishing line and the weighted body in such manner as to effect a fluttering action of the plate when the lure is reeled in, substantially without corresponding action of the weighted body and the fish-hook attached thereto, said oscillator plate being located ahead of the hook point and mounted for movement as the lure is reeled in, into position over and above the hook point as a hook guard to preclude snagging.

2. A fish lure comprising in combination a weighted body and a fish-hook fixed thereon, an oscillator plate, and means associating said plate with a fishing line and the weighted body in such manner as to effect a fluttering action of the plate when the lure is reeled in, substantially without corresponding action of the weighted body and the fish-hook attached thereto, the fishing line being fastened to the plate adjacent to that face which is lowermost when the lure is reeled in, for imparting a planing action to the plate.

3. A lure characterized by its tendency to go promptly into action upon being retrieved from the cast, said lure comprising a hook-bearing body, and a thin planar substantially ovoid oscillator plate, said plate having a lower end loosely connected to the body, an upper opposite end, and a line attaching means located upon the plate at a point removed from the center of gravity of the plate, in the direction of said lower end, whereby the resistance of water upon the plate when planing and drawn by the line, together with the overbalanced condition of the plate resulting from the offset location of the line attaching means, causes the plate to oscillate from side to side describing a surface of a cone at each oscillation.

4. A lure which comprises in combination, a longitudinal heavy body arched substantially throughout its length and having a perforate forward end, a fish-hook fixed to the opposite end of the arched body with the point of the hook directed toward said perforate end, a ring loosely supported in the perforation of said forward end of the body, in a plane which passes through the plane of the fish-hook, a thin oscillator plate having a lower end including a perforation engaged by said ring, said plate being substantially planar and arranged at right angles to the plane of the ring, and a line attaching means on the plate located substantially centrally thereof but at a point removed from the center of gravity in the direction of the ring.

5. A lure which comprises in combination, a longitudinal heavy body arched substantially throughout its length and having a perforate forward end, a fish-hook fixed to the opposite end of the arched body with the point of the hook directed toward said perforate end, a ring loosely supported in the perforation of said forward end of the body, in a plane which passes through the plane of the fish-hook, a thin oscillator plate having a lower end including a perforation engaged by said ring, said plate being substantially planar and arranged at right angles to the plane of the ring, and a line attaching means on the plate located substantially centrally thereof but at a point removed from the center of gravity in the direction of the ring, said ring being detachable from the plate for substitution of differently finished plates.

6. A lure which comprises in combination, an elongated thick and heavy arched metallic body having a forward leading end, and a rear end including a seat for a fish-hook shank, said seat being elongated and disposed substantially upon the major axis of the body, and terminating at the rear end thereof, means securing the hook to the body with its shank resting in the hook seat, and with the point of the hook directed toward the forward leading end of the body, an oscillator plate of thin light-weight material, substantially planar and of void configuration, and including a free end and an attaching end, a line attaching means on the plate located at a point remote from the center of gravity of the plate, in the direction of the attaching end thereof, and means loosely connecting the attaching end of the oscillator plate to the forward leading end of the arched body.

7. A lure which comprises in combination, an elongated thick and heavy arched metallic body having an upper concave surface and a lower convex surface, a forward leading end, and a rear end, a fish-hook having a shank fixed to and extending rearwardly beyond the rear end of the arched body along its major axis, a point on the hook pointing substantially at the forward leading end of the body, over the concave surface thereof, an oscillator plate considerably thinner and lighter in weight than the body, said plate being planar and substantially ovoid, and having a free end and an attaching end, a line attaching means on the plate located substantially centrally thereof but at a point removed toward the attaching end at a distance from the center of gravity of the plate, and means loosely connecting the attaching end of the oscillator plate to the leading end of the arched body, said means being adapted to limit axial rotation of the plate relative to the body.

8. A lure which comprises in combination, an elongated thick and heavy arched metallic body having an upper concave surface and a lower convex surface, a forward leading end, and a rear end, a fish-hook having a shank fixed to and extending rearwardly beyond the rear end of the arched body along its major axis, a point on the hook pointing substantially at the forward leading end of the body, over the concave surface thereof, an oscillator plate considerably thinner and lighter in weight than the body, said plate being planar and substantially ovoid, and having a free end and an attaching end, a line attaching means on the plate located substantially centrally thereof but at a point removed toward the attaching end at a distance from the center of gravity of the plate, a readily detachable ring loosely connecting the leading end of the body and the attaching end of the oscillator plate, said ring having its plane normal to the mean plane of the body and that of the oscillator plate so as to limit axial rotation of the plate relative to the body.

9. A lure characterized by its tendency to go promptly into action upon being retrieved from the cast, said lure comprising a hook and a weighted hook-bearing body having a forward up-turned end, with the point of the hook directed toward said up-turned end, and a thin planar substantially ovoid oscillator plate of relatively light weight, said plate having a lower end loosely connected to the body, an upper opposite end, and a line attaching means located upon the plate at a point removed from the center of gravity of the plate, in the direction of said lower end, whereby the resistance of water upon the plate when reeled in, together with an overbalanced condition of the plate resulting from the offset location of the line attaching means, causes the plate to oscillate sidewise and to project at an inclination rearwardly as a guard extending over and above the hook point.

10. A fish lure comprising in combination a weighted body having an upturned forward end and a convex bottom face, and a fish-hook fixed thereon with its point directed toward the upturned end of said body, a thin planar lightweight oscillator plate approximating in length the length of the weighted body, and swivel means associating said plate with a fishing line and the weighted body in such manner as to effect a fluttering action when the lure is reeled in, substantially without corresponding action of the weighted body and the fish-hook attached thereto, the fishing line being fastened at that face of the plate which corresponds to the convex bottom face of the body when the body and the plate are linearly extended.

11. A fish lure comprising in combination a weighted body having an upturned forward end and a convex bottom face, and a fish-hook fixed thereon with its point directed toward the upturned end of said body, a thin planar lightweight oscillator plate approximating in length the length of the weighted body, and swivel means associating said plate with a fishing line and the weighted body in such manner as to effect a fluttering action when the lure is reeled in, substantially without corresponding action of the weighted body and the fish-hook attached thereto, the fishing line being fastened at that face of the plate which corresponds to the convex bottom face of the body when the body and the plate are linearly extended, the fastening being effected at a point slightly removed from the center of gravity of the plate in the direction of the body.

KENDALL J. THOMAS.